United States Patent
Chen et al.

(10) Patent No.: US 7,096,335 B2
(45) Date of Patent: Aug. 22, 2006

(54) STRUCTURE AND METHOD FOR EFFICIENT MANAGEMENT OF MEMORY RESOURCES

(75) Inventors: Shawfu F. Chen, New Milford, CT (US); Robert O. Dryfoos, Hopewell Junction, NY (US); Allan Feldman, Poughkeepsie, NY (US); John M. Tarby, Sherman, CT (US)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 10/649,437

(22) Filed: Aug. 27, 2003

(65) Prior Publication Data

US 2005/0050291 A1    Mar. 3, 2005

(51) Int. Cl.
*G06F 12/00* (2006.01)
(52) U.S. Cl. .................... 711/165; 711/117
(58) Field of Classification Search ............. 711/117, 711/165, 170; 707/202, 205
See application file for complete search history.

(56) References Cited

U.S. PATENT DOCUMENTS

| | | |
|---|---|---|
| 5,649,231 A | 7/1997 | Kitano |
| 5,893,924 A | 4/1999 | Vakkalagadda et al. |
| 6,192,428 B1 | 2/2001 | Abramson et al. |
| 6,442,139 B1 | 8/2002 | Hosein |
| 2003/0041115 A1* | 2/2003 | Chen et al. ........... 709/213 |

OTHER PUBLICATIONS

Duvall et al., "Gating Techniques for Improved Input/Output Queuing", IBM TDB vol. 29, No. 6, Nov. 1986.
Feldman, "PUT13 Enhancements to TPF MQSeries Support", Oct. 2000.
U.S. Appl. No. 10/014,089, Filed Dec. 11, 2001 by Chen et al entitled "Distributing Messages Between Local Queues . . . Shared Queue".
U.S. Appl. No. 09/790,853, Filed Feb. 22, 2001 by Chen et al entitled "High-Performance Memory Queue".
U.S. Appl. No. 09/938,029, Filed Aug. 23, 2001 by Chen et al entitled Reconstructing Memory Resident Queues of an Inactive Processor.
U.S. Appl. No. 09/938,031, filed Aug. 23, 2002 by Chen et al entitled "Managing Memory . . . Queues".

* cited by examiner

*Primary Examiner*—Hiep T. Nguyen
(74) *Attorney, Agent, or Firm*—Eugene I. Shkurko; Andrew J. Wojnicki, Jr.

(57) ABSTRACT

A structure and method is provided for optimizing memory resources, by establishing a history file for recording data processing criterion. The history file is then recorded in a first memory. Information either stored in the first memory or scheduled to be stored in the first memory can then be selectively reallocated and stored in an alternate memory. All or portions of the reallocated information can then be restored back to the first memory subsequently, with reference to the history file.

20 Claims, 5 Drawing Sheets

STRUCTURE AND METHOD FOR EFFICIENT MANAGEMENT OF MEMORY RESOURCES

BACKGROUND OF THE INVENTION

The present invention relates generally to the field of computer systems, and specifically to a method and structure of managing memory resources in a computing environment.

A computing environment can be comprised of a single computer unit, such as a PC, or a plurality of nodes in processing communication with one another. The nodes themselves may be comprised of one or more individual units, such as PCs or even monitors, or large computing networks that are electronically linked to one another locally or remotely. Independent of the size of the environment, processing tasks are performed through the use of messages. Messages can be used to perform functions for a single application running on a single unit, or for multiple applications running on multiple nodes. In a larger and more complex computing environment, messages are also used to establish communications between nodes or provide access to shared common resources.

A message is simply a string of data comprised of bits and bytes, representing different items. For example, a message can include names and addresses, images and documents that need to be transferred (sent or received) at a given processing time. Such data can include character strings, bit strings, binary integers, packed-decimal integers, floating-point numbers and the like. The data string may also include destination information or the return address of the requesting node or application, when applicable, depending on the message type. There are generally four types of messages: a "request" message, a "reply" message, a "one-way" message such as a command, and a "report" message that is used when something unexpected occurs.

At any one time, many messages may be in transit concurrently. Due to the extent of the messages and to prevent their loss, queues are established to hold unprocessed messages up until processing time. In more complex environments, a plurality of applications or nodes may even share one or more queues at any one time. Therefore, it is important that the type of message queuing implemented provides reliable storage and transfer of information independent of the underlying running application or even the device type. To address such issues and minimize compatibility concerns, sophisticated commercial message queuing packages, such as IBM's MQSeries, have been developed that offer a high-level application program interface (API) which shields programs from the complexities of different operating systems and underlying networks.

Regardless of the type of queuing provided, in most instances, a collection of different types of queues may be implemented to address the transfer needs of a particular environment. In such instances, a queue manager, stores the implemented message queues in a storage area set-aside in a dedicated memory location in the computing environment. This memory location, hereinafter referred to as the permanent memory or permanent memory location, is designed to hold transferred information (i.e. messages and queuing information) in transit until processing completion.

Unfortunately, the permanent memory has only a finite storage capacity. In critical peak periods, depending on the amount of messages requiring concurrent storage, the storage capacity may become exhausted. This is especially true in situations when executing applications utilize files that are growing at a rate faster than the data can be processed and removed.

When capacity is met or exceeded, further storage becomes impossible and a "queue full" condition is established. The inability to provide further storage when needed may cause loss of important information and impact further processing, at least until the condition is relieved.

In recent years, memory management techniques have been introduced to boost storage capacity by providing a temporary memory, such as a disk, at a different location in order to complement the capacity of permanent memory during critical peak periods. When the permanent memory reaches capacity or nears capacity, new or previously stored information is reallocated and stored in the temporary memory for later retrieval. The reallocated information will be later transferred back to the permanent memory once the storage capacity concerns of the permanent memory have been alleviated.

The challenge, however, with prior art methodologies that utilize reallocation techniques remain in the transferring of the reallocated information back to the permanent memory. In complex environments, it is of utmost importance to determine correctly how much data can be transferred back during each processing period without overwhelming or under-utilizing the permanent memory and the processing environment. Transferring too little information back at any one time from the temporary memory into the permanent memory, will require information to be retrieved frequently and transferred back, causing unintended processing delays. It is more efficient to transfer back larger quantities of information at any one time when possible, rather than to transfer the same amount over multiple transfers.

Similarly, too much data transfer at one time can cause an over-capacity condition leading to more reallocation of data from the permanent memory back to the temporary memory. The key, therefore, is to transfer back the largest amount of data without exceeding the storage capacity of the permanent memory.

One other consideration is to control the data transfer in such a way that doesn't impact one or more of the running applications. A sudden increase in data influx may easily overwhelm a running application, even in instances where the permanent storage capacity is not a consideration. The latter is especially important when queuing packages are utilized that offer a high-level application program interface (such as IBM's MQSeries).

Consequently, a new method and structure is needed that can determine an optimal rate of information retrieval and transfer back to the permanent memory after information is reallocated to a temporary memory due to storage capacity concerns.

SUMMARY OF THE INVENTION

A structure and method is provided for optimizing memory resources, by establishing a history file for recording data processing criterion. The history file is then recorded in a first memory. Information either stored in the first memory or scheduled to be stored in the first memory can then be selectively reallocated and stored in an alternate memory. All or portions of the reallocated information can then be restored back to the first memory subsequently, with reference to the history file.

In an alternate embodiment of the present invention, a method of optimizing memory resources in a computing environment is provided with at least one running application using message queuing. This method provides for the establishing of a history file containing a historical message processing rate for the running application. The history file is then stored in a memory location in the computing environment. Queuing Information residing or scheduled to be stored in this first memory can then be selectively to an alternate memory. Reallocated information can then be restored to the first memory by reference to the history file. The history file will determine how much queuing information can be restored back to the first memory by unsweeping after comparing the history file including the historical message processing rate to a current message processing rate and determining current storage capacity available in the first memory.

DETAILED DESCRIPTION OF THE PREFERRED EMBODIMENTS

The present invention addresses and solves the problems associated with the prior art methodology currently in practice for the management of storage and retrieval of information, especially as it relates to information stored in messaging queues. The present invention provides for a technique that utilizes both a permanent memory and an alternate complementary memory, hereinafter referenced as alternate memory, to address information storage needs of the environment. Information may be reallocated either selectively, such as by a user, or based on capacity restrictions. After reallocation, the present invention provides for a retrieval technique during which the reallocated information can be restored back to the permanent memory under optimal processing conditions, so that the permanent memory and the environment are neither under-utilized nor overwhelmed during the process of information restoration.

Figure 1:
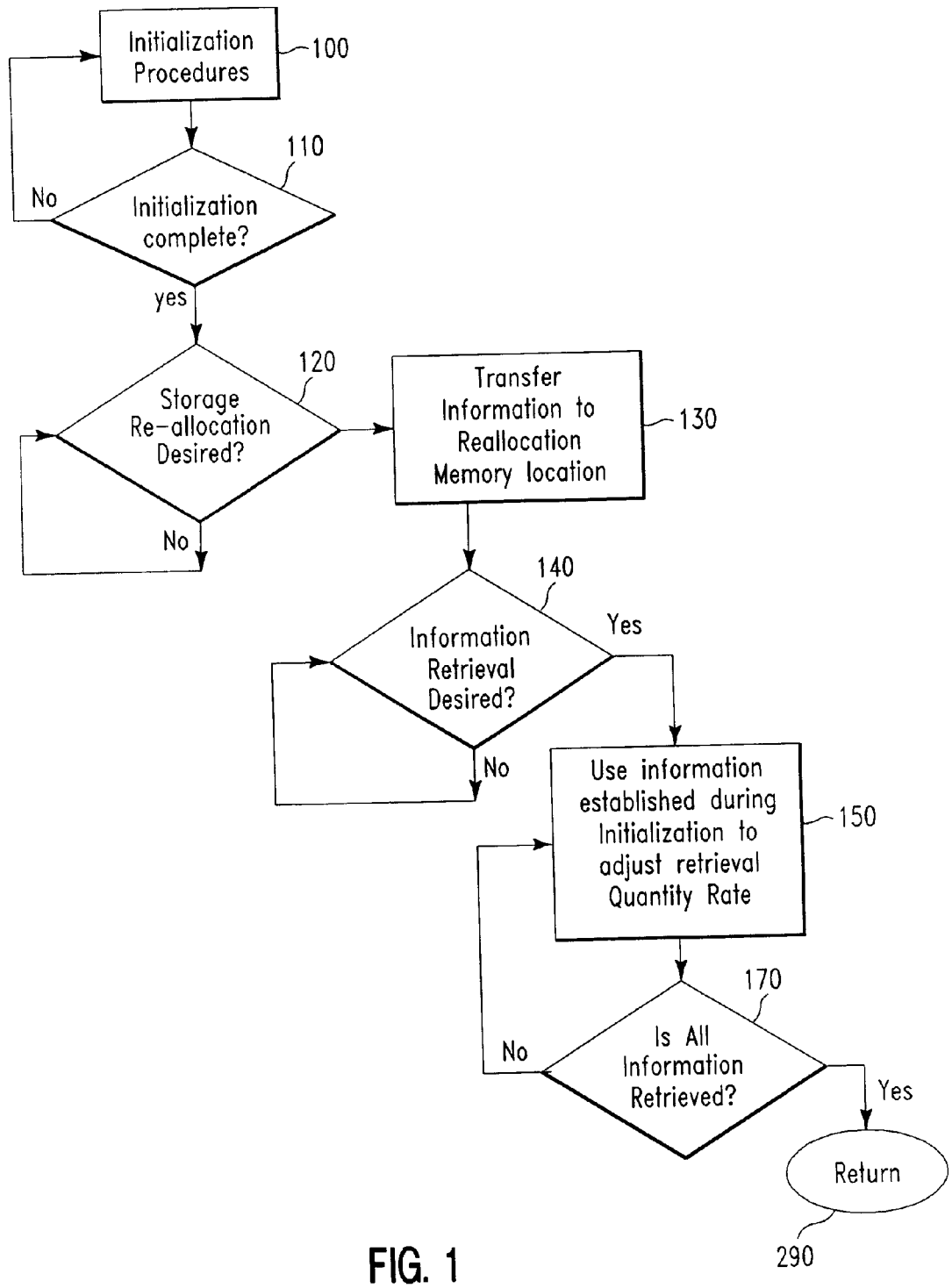
FIG. 1 is a flowchart illustrating an embodiment of the invention.

FIG. 1 is a flowchart illustrating an embodiment of the present invention. As depicted in FIG. 1, to achieve optimal processing conditions during the retrieval of reallocated information, past processing history must be first established and tracked over a period time to ensure its reliability. This process is conducted during initialization procedures, shown at 100 in FIG. 1, and may be inclusive of several processing characteristics including but not limited to frequency of access and processing time. The processing characteristics may pertain to a single application running on a single computer unit, or to many aspects of a large computing environment. For simplicity of reference and ease of understanding, however a single application is used in the discussion of the present invention provided below and in the embodiments illustrated in FIGS. 2 and 3, but it should be understood that the teachings of the present can be equally applied to multiple applications or an entire large computing environment having many nodes and components.

Figure 2:
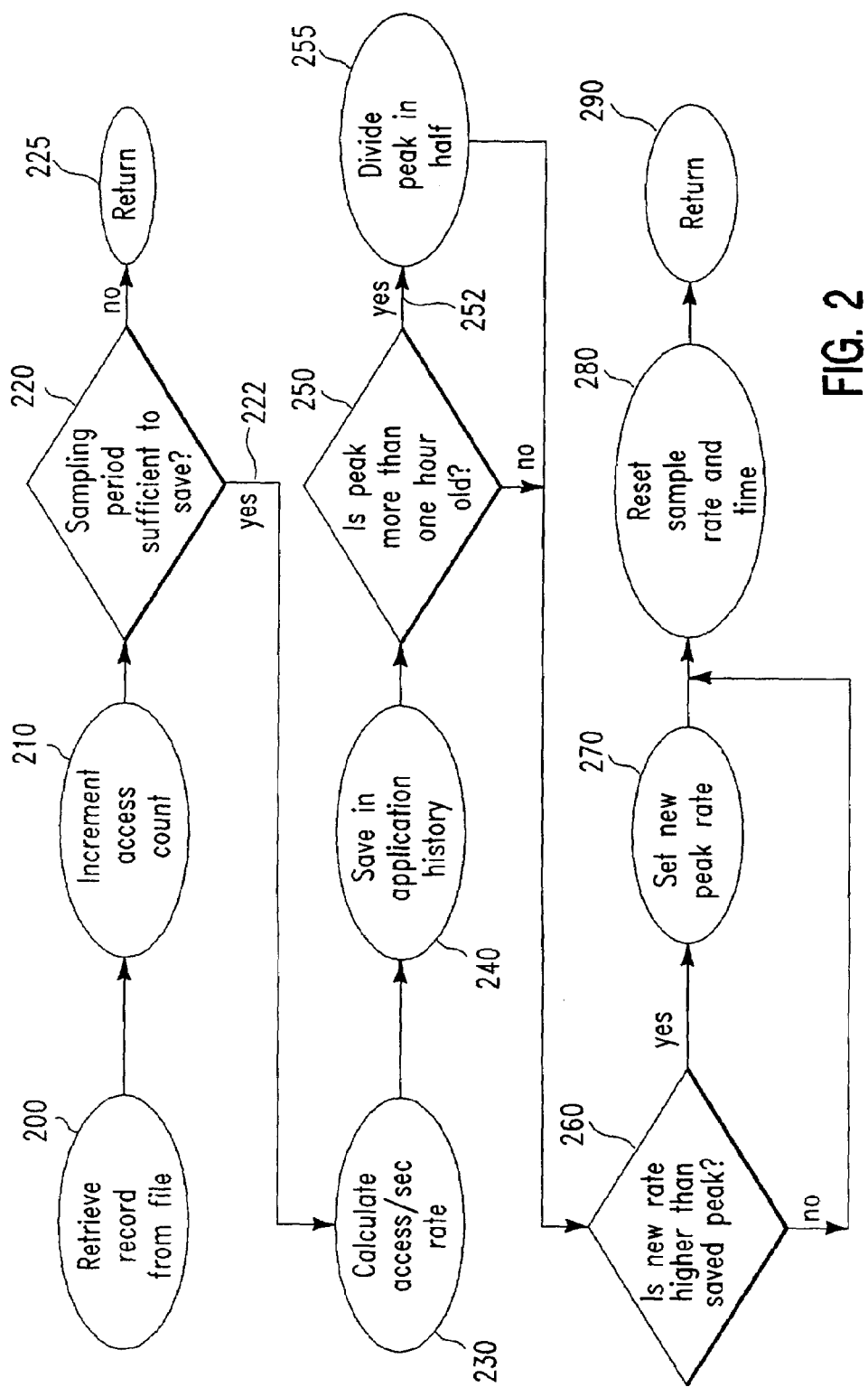
FIG. 2 is a flowchart illustrating the creation of a history file as per one embodiment of the present invention.

To accomplish this task, the past processing history when obtained is stored in a history file located in a memory location, preferably in the permanent memory, for later use. The processing history, as per one embodiment of the present invention, is periodically adjusted so as to reflect any major processing changes. A history file is maintained in the computing environment for the processing history of an application, for example. FIG. 2 illustrates an example of maintaining a processing history as per an embodiment of the present invention and will be discussed in detail later.

Once a history file is established, whether containing a peak access rate or additional information, the file will be periodically updated to reflect updated information. Normal operation will then continue, with data and information being stored in the permanent memory until reallocation either becomes necessary or desired as shown at 120. Note that with the advent of having access to an alternate memory, the user or a program, may interactively or automatically (i.e. by scheduling etc.) desire to take advantage of the expanded memory capacity and reallocate information before capacity concerns even arise, just for ease of processing or other similar reasons.

Required or selective reallocation is conducted in the same manner for either case, as provided at 130. Data and information, either destined for permanent memory or already stored in the permanent memory, is reallocated to the alternate memory instead. Reallocated information, is ultimately restored to permanent memory for a variety of reasons such as processing ease and permanency.

Restoration of the reallocated information back to the permanent memory, under the teachings of the present invention is performed using historical behavior determined during the initialization process and stored in the history file as shown at 140. It may not be feasible, necessary or even desired to retrieve and/or restore all of the reallocated information from the alternate memory at once. For example, if the reason for reallocation was the exhaustion of permanent memory, once the capacity has been partially restored, restoration of only a portion of the reallocated information may be possible at a specific time. Transferring the entire reallocated information can, in such a case can overwhelm the permanent memory once again. If only partial restoration is possible or desired, records can be previously established in the history file that enable the restoration to be conducted based on a certain criteria. For example, restoration can be performed on the basis of restoring the most frequently accessed data first. Alternatively, restoration can be performed on the basis of most recently reallocated data to be restored first, etc. In this example, the history file is used primarily to establish how much information is to be retrieved and restored to permanent memory during any one processing time period as shown in 150 in FIG. 1. To illustrate the retrieval and restoration process in greater detail, an embodiment of the present invention is provided in FIG. 3 and will be later discussed in detail.

Referring now to FIG. 2, an example of generation of a history file is illustrated as per an embodiment of the present invention. In FIG. 2, it is desired to establish an optimal processing rate to be stored in the history file for later use. To accomplish this task, the most recent performance of a given application is first tracked over time. It is important in this approach to maintain an accurate history of the rate of retrieval of data by an application accounting for periods when there may be a spike in the rate, while at the same time not preserving that spike indefinitely.

In FIG. 2, each time an application accesses a certain file as shown at 200, the access count is incremented in a counter, as provided in 210. The counter is incremented until a predetermined sampling value is reached. The sampling value may relate to a time period, for example of 10 seconds. In this way frequency of access is established during a certain time period. In this example, thee sampling time value must be sufficiently large to minimize the influence of statistical anomalies. When the sampling period is not yet deemed sufficient to save the retrieval rate, the process of monitoring the count continues (225). Once the sampling period is deemed sufficient, the frequency of access or the value of the counter at that time is then saved, as shown at 222. Based on the sampling time value and the frequency of access, a sample access rate (per second) can then be calculated (by dividing the frequency of access by the sampling time) and saved, as shown at 230.

In addition to tracking the number of accesses and calculating the sample access rate (of the most recent period), the processing rate is also calculated during the high peak processing periods. This rate, hereinafter referenced as the "peak rate", is calculated in a similar manner to the sample access rate. In the embodiment illustrated in FIG. 2, the peak rate is tracked over a one hour period as shown at 250. Here a measure is implemented to assure that the peak rate maintained in the application history does not represent a stale value. As shown in FIG. 2, if the peak rate is calculated prior to a certain time, one hour in this example (252), the peak rate is then adjusted downward e.g. by dividing it in half as shown at 255.

Before the peak rate is saved in the history file, the peak rate is compared against the current sample access rate. This comparison is made because in order to achieve optimal processing time, it is important to obtain and save the highest rate of retrieval during the current cycle. Therefore as shown at 260, the peak rate is compared to the sampled rate. If the current sample access rate has a higher value, then the current sample access rate is stored as the peak rate in the history file, as shown at 270. In either case, the rate with the higher value, be it the old or divided peak rate value or the current sample access rate, will be stored in the history file as the new peak rate and will be referenced as the peak rate for retrieval purposes during subsequent steps. The counters and timers are then reset (280) to allow monitoring to begin for the next period (290).

Figure 3:
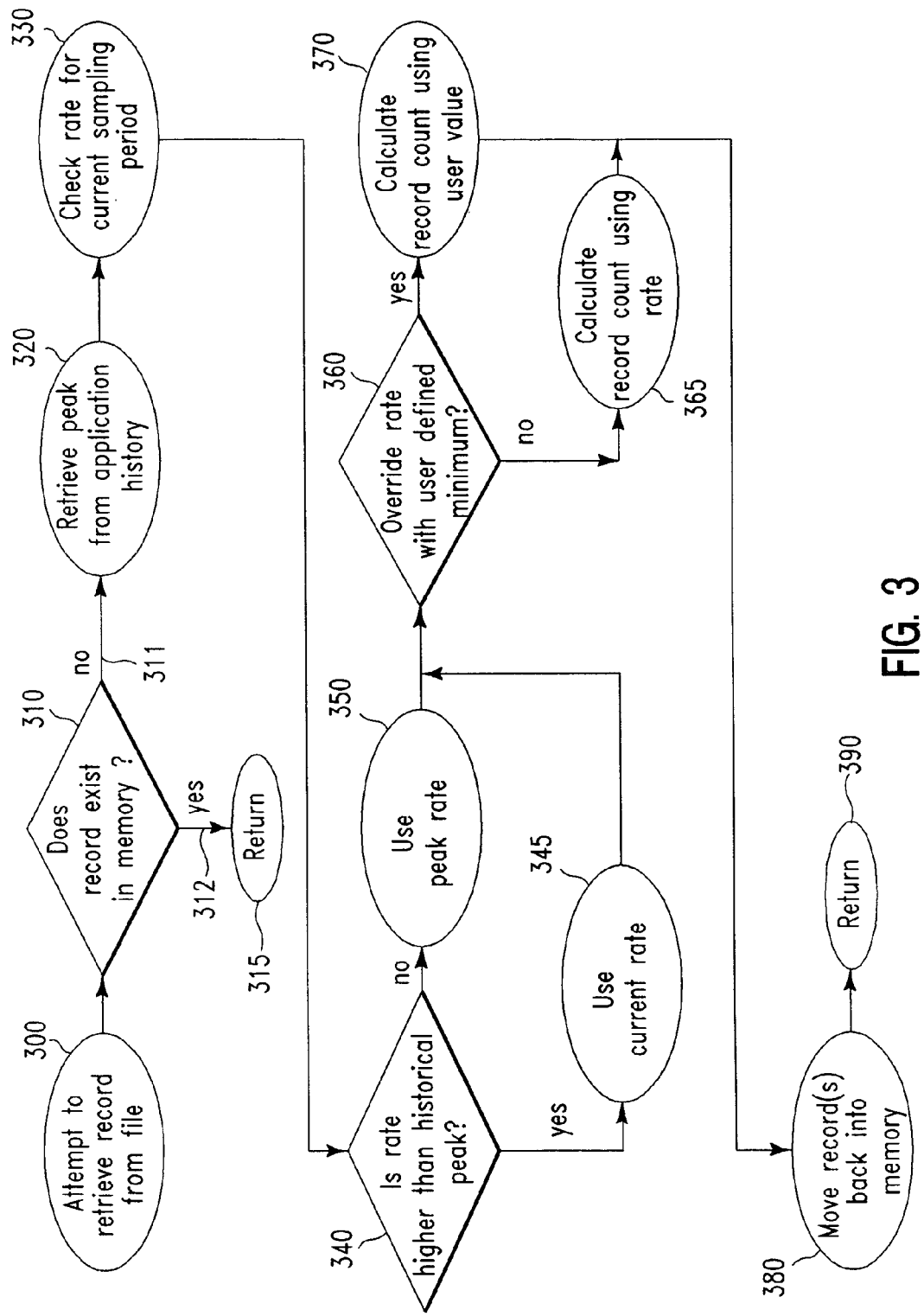
FIG. 3 is a flowchart depicting information retrieval using the history file created as per the embodiment of FIG. 2.

Referring back to FIG. 1, normal operation will then continue after the generation of the history file discussed in FIG. 2 until information is reallocated. Once a request for restoration of reallocated data is processed, all or portions of the reallocated data will be restored by using the information stored in the history file generated in the embodiment of FIG. 2. FIG. 3 provides an illustration of how the information previously stored in the history file generated in the embodiment of FIG. 2 will be used.

In FIG. 3, the history file established in FIG. 2 is used to predict the processing needs of the information during retrieval and restoration. In FIG. 3, when an information retrieval request is processed as shown at 300 in FIG. 3, it is first determined if the information already exists in the permanent memory, as shown at 310. This is to ensure that attempts at retrieval are not made unnecessarily to the alternate memory if the information was never reallocated or already retrieved at an earlier time (312).

If the information is reallocated and has never been restored, however, the information needs to be retrieved from the allocated memory (path 311) and transferred back into the permanent memory. The history file is then accessed to determine the amount of the reallocated data scheduled to be transferred from the alternate memory back to the permanent memory should be transferred per processing period.

In order to determine the current permanent memory capacity and consequently determine the optimal information transfer amount, several variables have to be checked. The first of these variables is the peak value obtained from the application history, as determined earlier. This step is shown at 320 in FIG. 3. Once the peak value is retrieved, this historical peak is checked (as shown at 340) against a current sampling rate, as provided at 330. The current sampling rate is the most recent processing rate obtained at retrieval request time. The higher of the current sampling value 345 or the historical value 350 is then compared against a user defined override, as shown at 360.

The purpose behind this comparison procedure is to determine if the retrieval need is higher or lower than the current allowable storage allocation needs in the permanent memory at retrieval request time. In this manner, if it is possible to obtain the entire retrieval record at one time, then retrieval will be accomplished at once to allow for optimal processing time. If however, the present allocation in the memory cannot accommodate the entire retrieval of the particular requested information, the retrieval has to be parsed out and provided during multiple processing intervals. The user defined override can also ensure that in situations where it is desired to control the memory allocation so as to reflect a different capacity or when it is desired to set minimum values, such override can be incorporated into the methodology used herein.

Once the higher of the value of the current rate 345 is compared to the historical use rate 350 against the user override rate 360, the higher of those values is then used as the target number of records to retrieve from file (either 365 or 370 as shown in FIG. 3).

After the target rate has been established, the target rate (370 or 365) will then be used to transfer records back into the permanent memory, as provided at 380. The values then will be reset and the system will await a new retrieval request (390).

When a complete record retrieval cannot be satisfied in one retrieval attempt, e.g. because it exceeds a historical peak value, the retrieval is parsed out over several retrieval processing intervals. In such instances, the procedures described above relative to FIG. 3 will be reiterated until all requested information is retrieved using optimal overall processing retrieval time. This concept is also illustrated in FIG. 1. The decision box shown at 170 in FIG. 1, provides for either the reiteration of the process until all requested information is retrieved or a return to the normal procedure until another request for information retrieval is received.

The present invention, provides a simple algorithm that relies on predictive and recent past performance of a given application so that high performing applications or other similar components of a computing system can be provided sufficient memory resources that will allow them to process data quickly even in an environment where there is an insufficient amount of memory available to satisfy the needs of all the applications currently running on the system.

Figure 4:
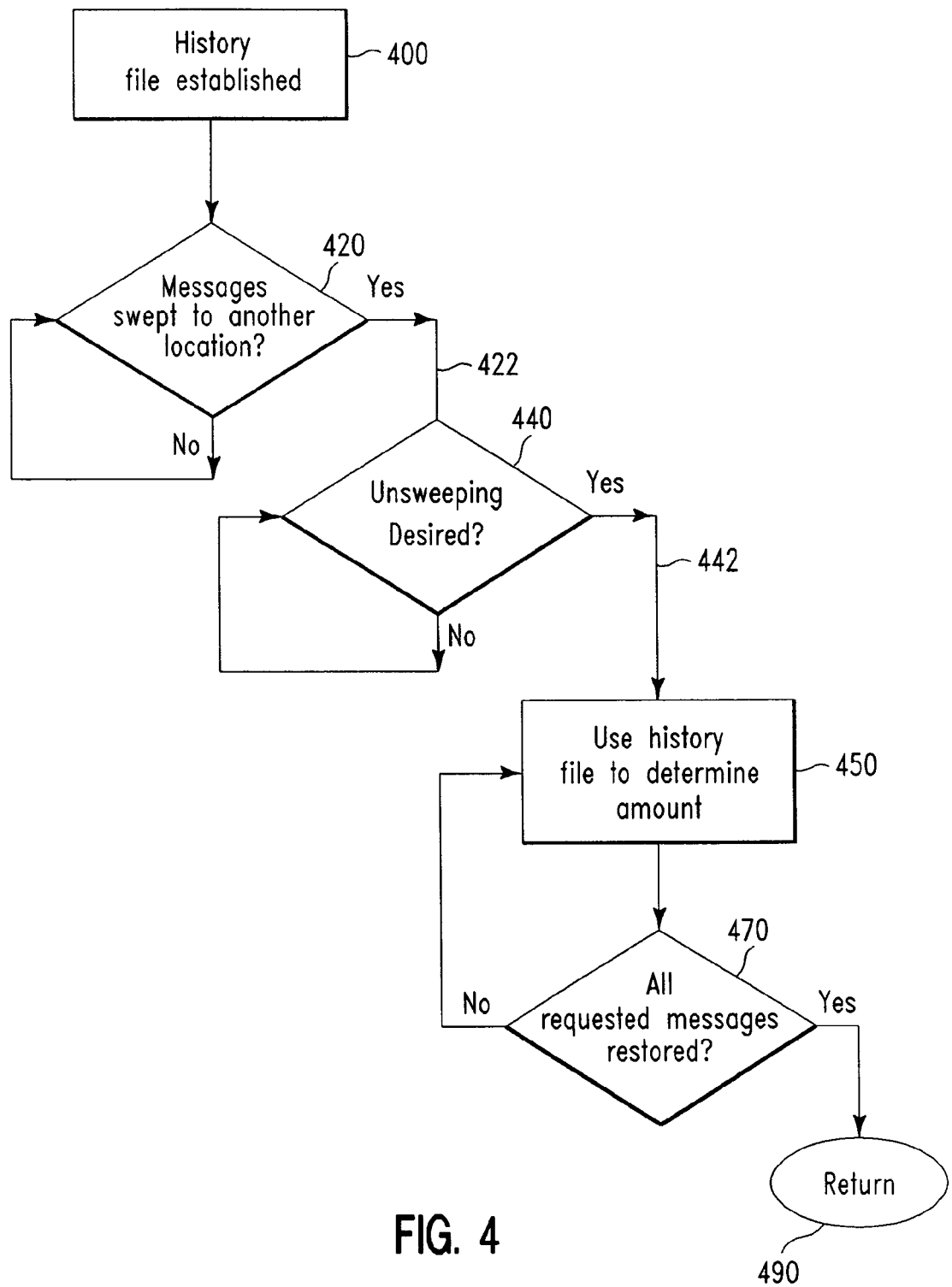
FIG. 4 is a flowchart depicting an embodiment of the invention as it relates to message queuing.

An example of an instance where the teachings of the present invention can improve both memory resources availability and overall performance is the application of these teachings to complex message queuing algorithms such as IBM's MQ Series as illustrated in FIG. 4. Memory resident queues such as that of IBM MQ series, are monitored at predefined time intervals. In such cases, when the monitoring indicates that a particular queue is not being serviced at a desired level, then action is taken to sweep one or more messages from the queue. The swept messages are removed from the queue and reallocated to an alternate memory location as provided in FIG. 4 at (path) 422. The sweeping of the messages frees up system resources associated with the messages, thus allowing other tasks to be serviced. If, after the sweeping it is determined that the queue can handle additional messages, then one or messages are transferred back on to the queue from the alternate memory location, a process known as unsweeping.

Sweeping can also occur when a large number of messages arrive on a queue that is being serviced. The excess messages, the amount that exceeds the queuing capacity, is reallocated to an alternate memory location, similar to the information retrieval process discussed earlier. At unsweep time, the excess messages are retrieved from a resident file or other allocated location back to the queue again as shown at 442.

One existing challenge with the unsweep function is that the transfer of messages back to the queues puts an unnecessary burden on the running operating system which can result in an immediate need to sweep the queues again. The problems associated with prior art currently in practice are also similar in this arena to the previously discussed problems of information retrieval in general. For one, it is difficult to know when and how much queuing messages are needed to be reallocated or retrieved during subsequent message transfer periods. In addition, the continuous threshing of messages during subsequent sweeping and unsweeping can waste system resources and impact performance speed and cause integrity problems.

An embodiment of the invention addresses such problem. By establishing a prior history file, the unnecessary sweeping and unsweeping of information can be eliminated. Continuous and unnecessary sweeping and unsweeping of information can negatively impact an application's ability to get messages from the queue and may even impact the underlying operating system running in the environment.

During the creation of a history file as shown at 400, the message queuing (MQ) queue rate is tracked and used in determining the number of messages that can be left in the memory when sweeping the queues so that sufficient messages will be left to be processed at any given time period. This will help the overall system performance as it cuts down on idle time and performance issues by trying to reach an optimal level by a reiteration process of sweeping and unsweeping.

As per the teachings of the invention, a user override can also be established, for example as a field identified as "SWEEPDEPTH" that can allow the user to specify a minimum number of requests to be overriding while performing the unsweep function.

It is also possible under the teachings of the present invention to avoid complete unsweeping of messages. As not all messages are needed to be retrieved at one time, whether controlled by the past history or by user overrides, a partial unsweep can be conducted which will tremendously alleviate system performance problems. In other words the unsweep function will only retain part of the messages until the number of messages in memory reaches either the user defined "SWEEPDEPTH" or a rate previously established in the history file, similar to the peak rate (selectively named as "Getrate") whichever has a higher value (similar to the embodiment depicted in FIG. 3). In this manner, sufficient messages are returned to permanent queue memory to allow the application to process messages from the memory queue for a specified period of time and the remainder of the excess messages are left in the alternate memory location until the application needs them. Unsweep will also be controlled by the resources that are available to the system based on assessing current needs of the environment (current processing rates) and referencing the previously stored information in the history file, as shown at 450. The history file will be used, if necessary during several processing periods, until all messages are restored as provided in 470.

Note that there are other instances where an unsweep function can affect system performance. In such instances when unsweep process becomes so excessive that it interferes with normal operation of an application and processing of data, under the teachings of the present invention, the sweeper monitoring will prevent certain queues to be swept. These queues(s) will be skipped based on determining which queues have just been unsweeping, by perhaps setting a certain time variable (up to a certain pre-established period of time), in order to avoid unnecessary sweeping after unsweep has started. This is especially true when an artificially low sampling rate occurs occurring during a period when the unsweep process first commences.

Figure 5:
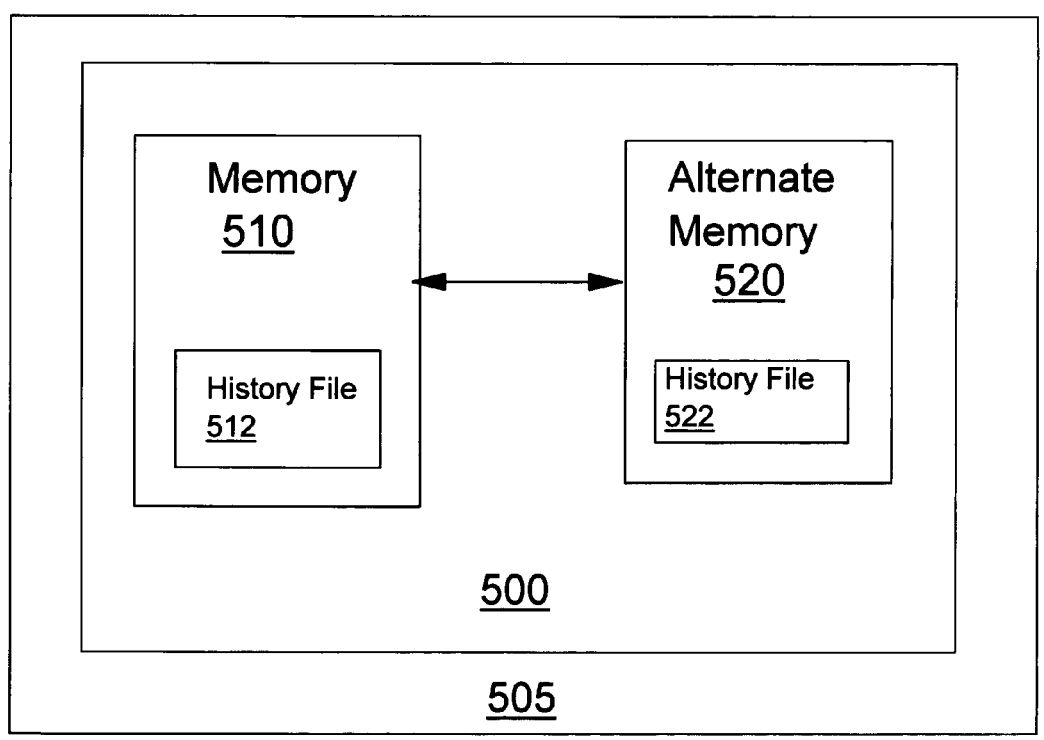
FIG. 5 is a block diagram illustrating an apparatus within a computing environment for transfer of information in accordance with another embodiment of the invention.

FIG. 5 is a block diagram illustrating an apparatus 500 within a computing environment 505 for transfer of information in accordance with another embodiment of the invention. The computing environment may include one or more computer units. As illustrated in FIG. 5, the apparatus includes a first memory 510 and an alternate memory 520. The first memory is operable to store processing information. The alternate memory is operable to store selectively reallocated processing information that is initially stored or scheduled to be stored on the first memory. A history file 512, 522 containing historical processing information is established about a computing environment, or alternatively, about at least one application running in the computing environment. The history file is stored selectively on the first memory, as shown at 512, or the alternate memory, as shown at 522. Based on historical processing information contained in the history file, the computing environment is operable to determine an amount of the reallocated processing to be restored back to the first memory.

While the invention has been described in accordance with certain preferred embodiments thereof, those skilled in the art will understand the many modifications and enhancements which can be made thereto without departing from the true scope and spirit of the invention, which is limited only by the claims appended below.

What is claimed is:

1. A method of optimizing memory resources, comprising:

establishing a history file recording a data processing criterion;

storing said history file in a first memory;

selectively reallocating information residing in or to be stored in said first memory to an alternate memory;

retrieving said reallocated information in a portion based on said data processing criterion established in said history file; and restoring said reallocated information back to said first memory.

2. The method of claim 1, further comprising the step of updating said history file after selective time periods to include most recent data processing information.

3. The method of claim 2, wherein said criterion includes rate of information retrieval.

4. The method of claim 3, wherein said history file includes historical processing rates for information retrieval.

5. The method of claim 4, wherein said historical processing rate is calculated by measuring historical a peak rate during which information processing rate is at its highest rate over a certain time period.

6. The method of claim 5, wherein said historical peak processing rate also records occasional spikes in capacity.

7. The method of claim 6, wherein said peak processing rate is updated frequently so that an old occasional spike record is not stored indefinitely.

8. The method of claim 5, wherein each time an application accesses a file residing in said memory during a sampling period, a count is established and incremented to track number of accesses made to said file.

9. The method of claim 8, further comprising the steps of ending sampling period when said count reaches a certain value; and calculating a sample access rate based on rate and frequency that said application accesses said file; and storing said access sample rate in said history file to be used later for information retrieval.

10. The method of claim 9, wherein said peak rates compared to said sample access rate and the higher of said two values is stored in said history file as a new peak rate for later retrieval.

11. The method of claim 9, wherein if said peak rate will be adjusted if it is obtained prior to a certain time period.

12. The method of claim 10, wherein said restoration of said information is performed by retrieving said new peak rate from said history file and comparing it to a most current processing rate, the higher of the two value establishing an information retrieval rate.

13. The method of claim 12, wherein said information retrieval rate is highest of three values of said new peak rate, said most current processing rate and a third user override rate.

14. The method of claim 1, wherein said retrieval rate is used to determine how much of said data can be restored to said memory during each processing period.

15. The method of claim 2, wherein if only a portion of said reallocated data can be restored during a processing period, remainder of said reallocated information will be restored to said first memory during one or more new processing periods by using said history file each time to determine how much information can be transferred during each new processing period so that said first memory is never under-utilized or overwhelmed by too little information or too much information transfer during any single processing period.

16. The method of claim 1, where a plurality of processing criteria are established and recorded in said history file.

17. The method of claim 16, wherein determination of which portion of data is to be restored, when complete restoration is not possible, is determined based on one or more criteria established in said history file.

18. A method of optimizing memory resources in a computing environment with at least one running application using message queuing, comprising:
   establishing a history file containing a historical message processing rate for at least one application running in a computing environment;
   storing said history file in a memory location in said computing environment;
   selectively sweeping queuing information residing in or to be stored in a first memory to an alternate memory;
   determining how much queuing information can be restored back to said first memory by unsweeping after comparing said history file including said historical message processing rate to a current message processing rate and determining current storage capacity in said first memory.

19. An apparatus for optimal information transfer in a computing environment, comprising:
   a first memory operable to store processing information;
   an alternate memory operable to store selectively reallocated processing information initially stored or scheduled to be stored on said first memory;
   a history file containing historical processing information established about a computing environment or about at least one application running in said computing environment, said history file being stored selectively on said first memory or said alternate memory;
   said computing environment operable to determine an amount of said reallocated processing information to be restored back to said first memory based on historical processing information contained in said history file.

20. The method of claim 19, wherein said computer environment comprises of at least one computer unit.

* * * * *